United States Patent [19]

Eckersley

[11] Patent Number: 4,995,054

[45] Date of Patent: Feb. 19, 1991

[54] DATA TRANSMISSION USING SWITCHED RESONANCE

[76] Inventor: Gregory P. Eckersley, 5 Reeves Court, Kew, Victoria 3101, Australia

[21] Appl. No.: 335,082

[22] PCT Filed: Jul. 8, 1987

[86] PCT No.: PCT/AU88/00244

§ 371 Date: Apr. 14, 1989

§ 102(e) Date: Apr. 14, 1989

[87] PCT Pub. No.: WO89/00364

PCT Pub. Date: Jan. 12, 1989

[30] Foreign Application Priority Data

Jul. 8, 1987 [AU] Australia ............................... PI2990

[51] Int. Cl.$^5$ ........................ H04B 3/36; H04L 25/02
[52] U.S. Cl. ...................................... 375/4; 178/63 R; 178/63 A; 178/66.1; 333/217; 375/36
[58] Field of Search ........................... 375/3, 4, 17, 36; 370/51, 52; 178/49, 63 R, 63 A, 63 B, 63 C, 64, 66.1, 70 R; 328/241; 333/213, 216, 217; 307/322, 324

[56] References Cited

U.S. PATENT DOCUMENTS

| | | | |
|---|---|---|---|
| 3,202,763 | 8/1965 | Gaunt, Jr. | 370/51 |
| 3,303,286 | 2/1967 | Schlichte | 370/51 |
| 3,369,075 | 2/1968 | Yourke et al. | 375/36 |
| 4,383,313 | 5/1983 | Sbuelz | 370/51 |
| 4,398,178 | 8/1983 | Russ et al. | 375/36 |

*Primary Examiner*—Benedict V. Safourek
*Attorney, Agent, or Firm*—Fulbright & Jaworski

[57] ABSTRACT

A transmission arrangement includes a switched resonant circuit (5) for switching data states of digital signals on a pair of transmission lines (1, 2) and a regenerative circuit (7) for feeding power back on the lines. The switched resonant circuit has a switching device (22) connected in series with an inductance (20) and parallel with a capacitance (21). A digital logic system (8) controls the switching device such that switching occurs at a line current zero crossover point. Where a change of data state is to be transmitted to a receiver (6), the logic system (8) turns the switching device on at an appropriate time. The switching device is switched off when the voltage ($+V_m$) on the lines reaches approximately the same magnitude in the opposite sense ($-V_m$). The change in the line voltage indicates a change of the data state to the receiver.

9 Claims, 3 Drawing Sheets

DATA TRANSMISSION USING SWITCHED RESONANCE

DESCRIPTION OF THE INVENTION

Many well known and standardised systems exist for serial data transmission. These systems fall into several categories, each of which suffers from a number of drawbacks when used for transmitting data on long lines. The most common form of low speed aerial data transmission is a current limited line transmitting system typified by the well known RS232 standard which suffers from the drawbacks that its transmission distance is limited, that its power consumption increases in proportion to the line length and that it is not easily adapted for multi-station use. The much older current loop standard as used by teletype machines does not suffer these latter problems, but introduces reliability problems as a result of the need to connect the transmitting switches in series with the lines, and as a result of losses and voltage spikes caused by line inductance. Another commonly used data transmission system involving the use of matched impedance termination allows high speed, but suffers from the drawback of energy losses in the terminating resistors, and the resulting need for the transmitting station to make good these losses.

This invention provides a means of transmitting data where low power consumption at any or all stations is an important factor, or where a simple means of electrically isolating the transmitting station from the line is a requirement. These requirements are important where electrical safety is needed, where noise immunity is important, and also where power supply is limited as in the case of battery powered equipment or where power is to be drawn from existing data lines or from an RS232 port on a personal computer. This invention also provides for controlled voltage slew rates, thus minimizing radiated electrical noise and timing errors.

All electrical lines used for transmitting data have distributed capacitance and inductance associated with them. In order to achieve an acceptable level of immunity to outside interference an adequately high signalling energy must be used. In existing data transmission systems the energy required is usually provided by an energy source associated with the transmitter.

The novelty of this invention consists of using the energy stored in the data lines and associated circuitry to signal data state transitions via the data lines by means of a switched resonant circuit. The invention resides in the use of an inductance-capacitance resonant circuit wherein the inductance may be that of the data lines alone or with additional inductance and wherein the capacitance may be that of the data lines alone or with additional capacitance and wherein the configuration of the resonant circuit may be altered by means of the operation of electronic switches included within the circuit. The transmission of data does not require loss or gain of energy in the resonant circuit and is achieved through appropriate switching of the said electronic switches to achieve a reversal of the polarity of the charge stored in the said capacitance thus signalling a change in the transmitted data state. Since any practical embodiment of the invention will involve some losses during normal operation a regenerative circuit is required. The momentary nature of the switch closure means that the data lines are effectively disconnected except during the period of line state transition. This allows multiple transmitting stations to be connected to a single set of data lines for "Party-line" or "Multi-drop" operation without interference by inactive transmitting stations.

In order to provide a clearer understanding of this invention, reference is taken to the following description in conjunction with accompanying drawings, in which.

Figure 1:
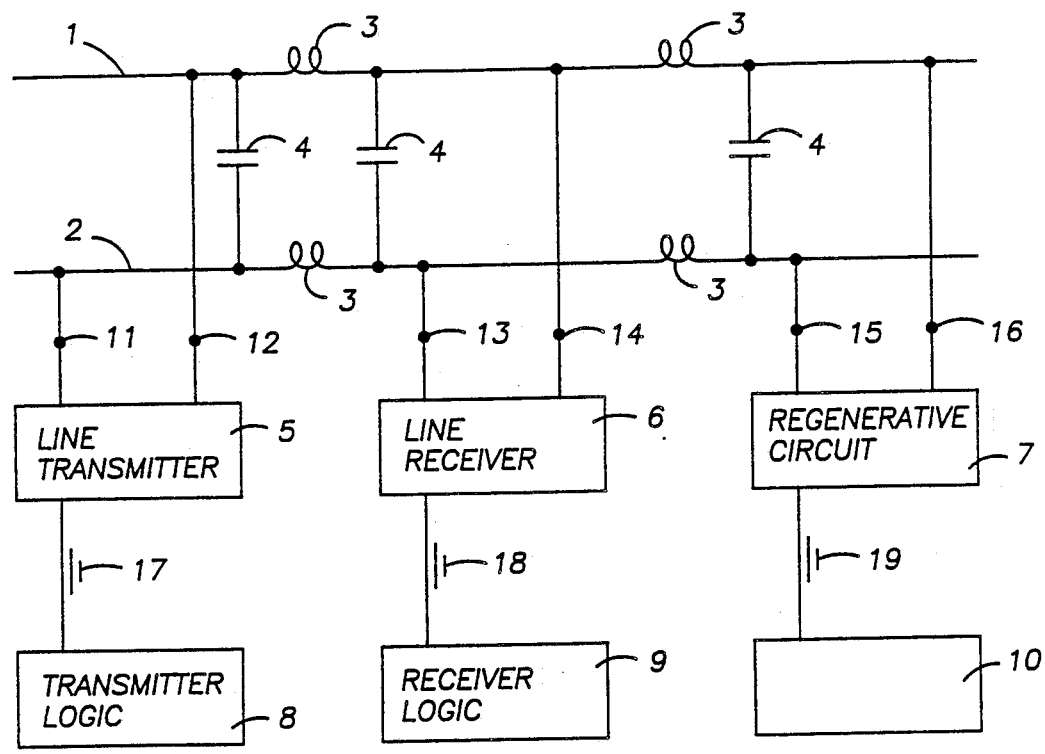
FIG. 1 is a schematic drawing showing a typical set of lines with connected transmitting and receiving stations.

With reference to FIG. 1, [1] and [2] are a typical set of co-axial or twisted pair data lines together with distributed line inductance [3] and the distributed line capacitance [4]. Connected to these data lines are one or more isolating resonant line transmitters [5], one or more isolating line receivers [6] and one or more regenerative circuits [7]. The transmitting digital logic systems [8] provide data via connection [17] to the line transmitters [5]. The voltage difference between the data lines [1] and [2] at any given point on these lines is called the signalling voltage at this given point. The line receivers [6] sense the signalling voltage via terminals [13] and [14]. A positive signalling voltage indicates one line data state, whilst a negative signalling voltage indicates the other line data state. The sensed line data state is usually isolated and conveyed to the receiving digital logic systems [9]. The transmitting digital logic systems [8] and the receiving digital logic systems [9] are not necessarily separate from each other, and in many embodiments a single digital logic system would be connected to both a line transmitter [5] and a line receiver [6].

A typical embodiment of the switching device [22] might use a pair of parallel or series connected transistors combined with series or parallel connected diodes. The operation of such an embodiment will be described with reference to FIGS. 1, 2 and 3. The switch [22] in this embodiment consists of a transistor [25] connected in series with a diode [23] used to transmit line data reversals from positive to negative, and of another transistor [26] and associated series connected diode [24] used to transmit line data reversals from negative to positive. The diodes prevent reverse current flow through their respective series connected transistors and also ensure that the switch [22] turns off at the correct moment when the line polarity has reversed and when the current through the switch has returned to zero. The transformers [27] and [28] isolate the data lines [1] and [2] from voltages associated with the transmitting digital logic system [8]. A pulse into the primary of one transformer [27] signals a transition to a negative data line polarity whilst a pulse into the primary of the other transformer [28] signals a transition to a positive data line polarity. The duration these pulses should be at least as long as the period required for complete reversal of the polarity of the signalling voltage.

Figures 2, 3:
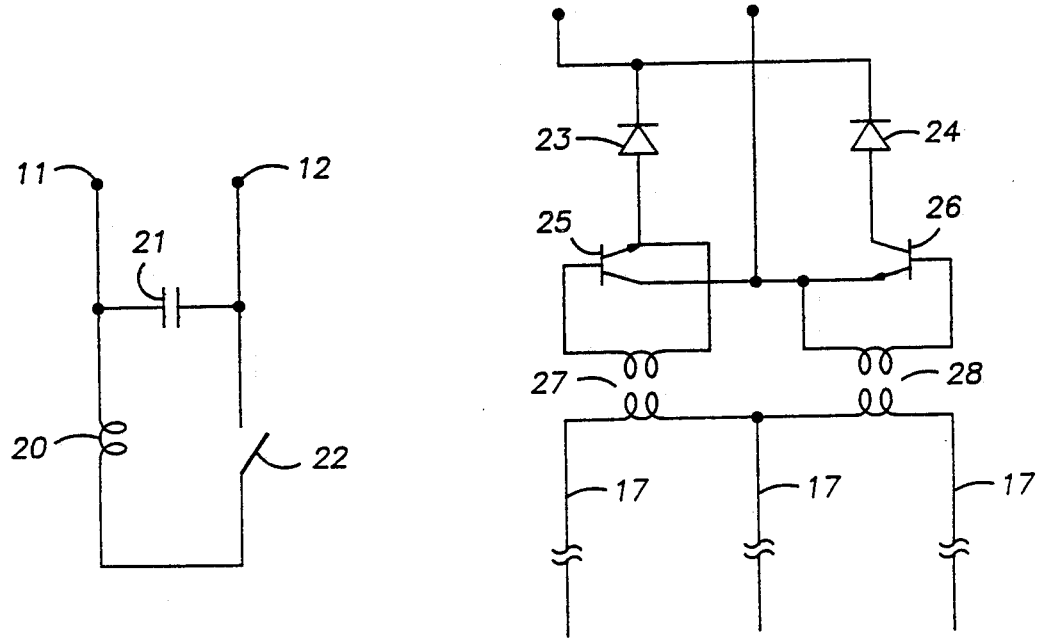
FIG. 2 is a schematic drawing showing an embodiment of the invention where the resonant circuit consists of lumped inductance and capacitance.
FIG. 3 is a schematic drawing of an embodiment of the invention where the switching device consists of a diode transistor network, together with transformer isolation.
Figure 4:
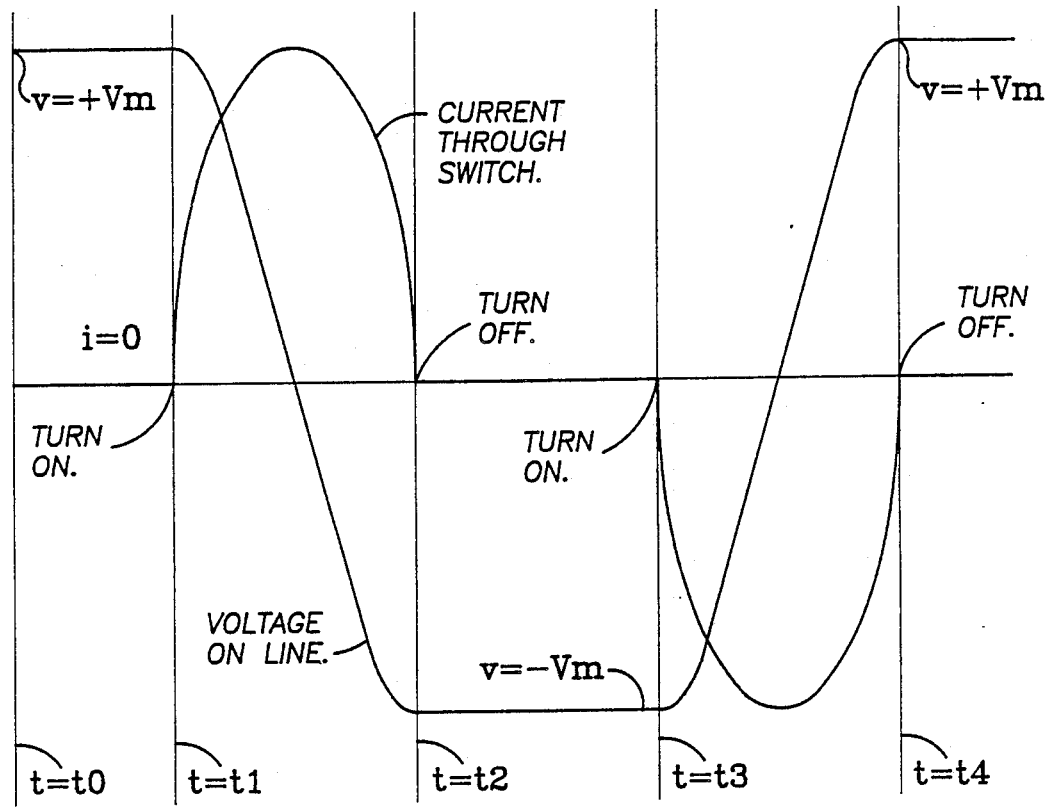
FIG. 4 is a plot of line voltage and line current versus time for a data state transition on the data lines where the resonant circuit is built entirely of lumped capacitance and inductance.

With reference to FIG. 2 a typical embodiment of the resonant line transmitter [5] would commonly involve additional lumped capacitance [21] and inductance [20] connected in series with an electronic switching device. The transmitter is connected via terminals [11] and [12] to the data lines [1] and [2]. If the signalling voltage is $+Vm$ at all points along the data lines and across the additional transmitter capacitance [21] and no current flows through any inductance then the line condition would be that of a static data state (one or zero). In order to achieve the alternate data state (zero or one) with a voltage $-Vm$ across the capacitances [4] and [21] and again no current flow then the switching device [22] must be switched on one or more times, each time switching off when the current through the switch decreases to zero, and only allowing the switch to pass current in one direction. Two variants of this embodiment will be referred in order to clarify the explanation of this switching process.

Figure 5:
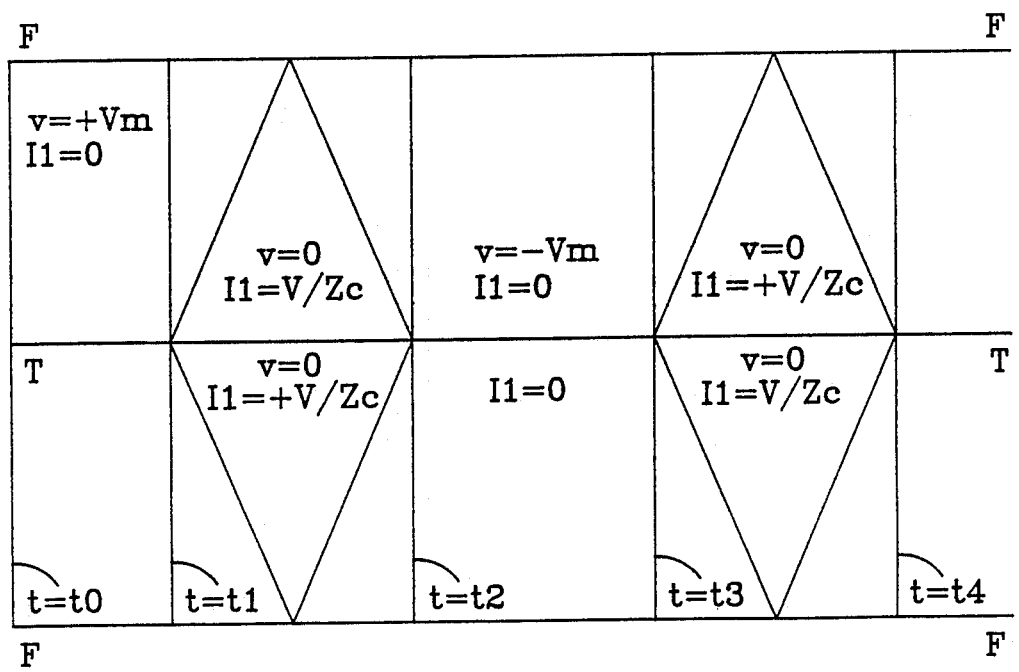
FIG. 5 is a diagram showing the voltage and current conditions on the data lines where the resonant circuit consists of the data lines themselves with no added inductance or capacitance. The ends of the data lines are connected to each other to form a circle.

In the first variant the line inductance [3] is considerably less than that of the additional inductance [20]. Under these circumstances the current through the driving circuit and the line voltage will follow a simple sinusoidal dependence on time once the switching device is turned on. Two successive line data state transitions will be described with reference to FIG. 5 and preceding figures. If the initial static signalling voltage is $+Vm$ indicating a positive line state and at some time $t=t0$ a transition ought be sent then at some later time $t=t1$ the switching device [22] is closed. Subsequently the current obeys the relationship:

$$i = Vm \sqrt{Ct/Ld} \, Sin(2\Pi(t-t1)/\sqrt{Ld \, Ct})$$

and the voltage follows the relationship:

$$v = Vm \, Cos[(t-t1) \, 2\Pi/\sqrt{Ld \, Ct}]$$

where the variables have the following definitions:
Vm = the peak line voltage,
Ct = the total capacitance value of both data line capacitance [4] and driver capacitance [21],
Ld = the value of the driver inductance [20],
i = the current through the drive inductance [20], and
v = the signalling voltage across terminals [11] and [12].

The voltage (v) and current (i) obey these sinusoidal relationships until the current returns to zero at which point the switch [22] is reopened at time $t=t2$ and the desired data line polarity reversal has been effected. The next line transition between times $t=t3$ and $t=t4$ back to the original polarity would occur in similar fashion and obeying similar relationships, but with the polarity of voltage (v) and current (i) reversed.

In the second variant the added capacitance [21] is considerably less than the distributed line capacitance [4] and the added inductance [20] is considerably less than the distributed line inductance [3]. In this case the ends of the data lines would normally be connected to each other in order to form a ring, and thus prevent successive reflections on the data lines. In this instance the resonant portion of the driver circuit consists of the lines themselves whilst the driver circuit effectively becomes a switch connected between terminals [11] and [12]. Two successive line data state transitions will be described here, with reference to FIGS. 1, 2 and 5. If the initial static signalling voltage at all points on lines [1] and [2] is $+Vm$ indicating a positive line state at some time $t=t0$ when a transition ought be sent then at some later time $t=t1$ the switching device [22] is closed. Subsequently the current rapidly climbs to a value equal to Vm divided by the characteristic line impedance (Vm/Zc). A voltage wave propagates both left and right of the transmitter taking the line voltage to zero. When both waves meet at the point furthermost on the lines from the transmitting station the line voltage reverses to $-Vm$. When both rightwards and leftwards travelling waves return to the transmitter at time $t=t2$ the switch [22] is reopened preventing polarity reversal of the current through the switch; at this point in time the desired polarity reversal has been achieved. A similar sequence between times $t=t3$ and $t=t4$ would reverse the signalling voltage back to $+Vm$. With reference to the transmission line diagram shown in FIG. 5 the horizontal axis indicates elapsed time and the vertical axis indicates the distance from the transmitting station. The line T—T indicates the point of transmission while the lines F—F indicate the point on the lines furthermost from the transmitter. Areas of constant line voltage and current are separated by solid lines. The values of line current and voltage in the different regions of the transmission diagram are as follows, where I1 represents the line current.

| | | |
|---|---|---|
| Region A : v = +Vm, | I1 = 0 | ; initial data state |
| Region B : v = 0, | I1 = −V/Zc | |
| Region C : v = 0, | I1 = +V/Zc | |
| Region D : v = −VM, | I1 = 0 | ; reversed data state |
| Region E : v = 0, | I1 = +V/Zc | |
| Region G : v = 0, | I1 = −V/Zc | |
| Region H : v = +Vm, | I1 = 0 | ; as for region A |

Figure 6:
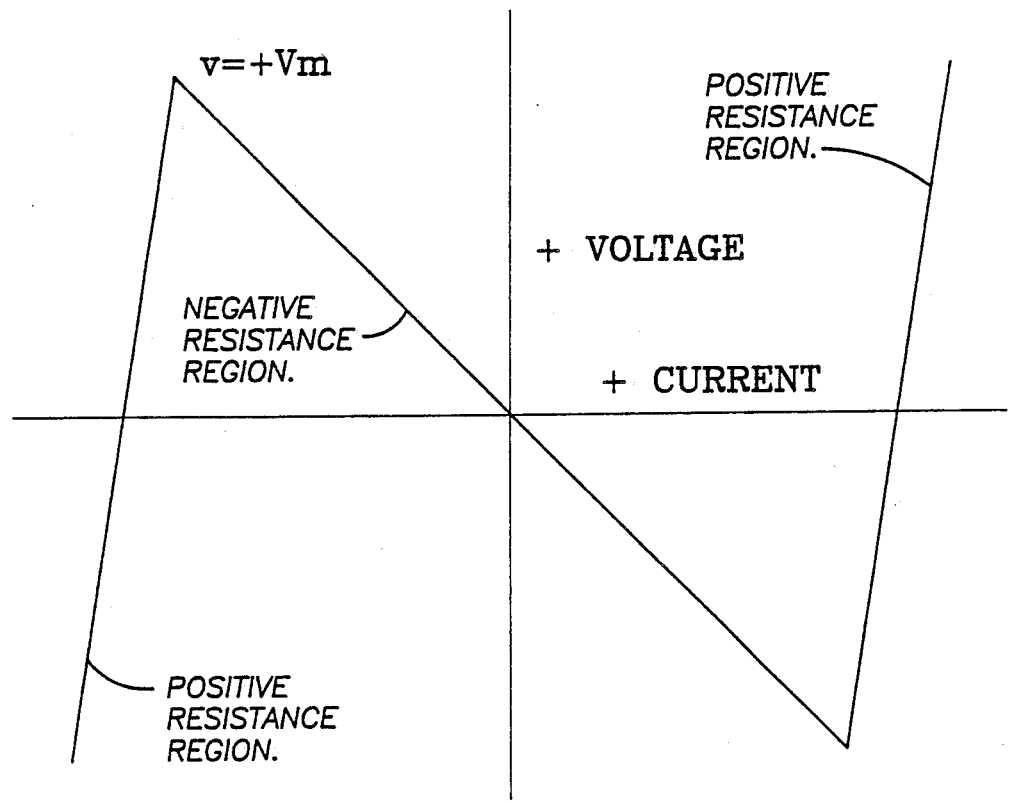
FIG. 6 is a typical plot of current versus voltage for the regenerative circuit.

Since the majority of electrical circuits have associated resistance, losses will occur during the resonant voltage polarity changes. Further undesired losses will occur as a result of inefficiencies in the electronic switching devices. These losses cause some loss in the magnitude of the signalling voltage after each polarity reversal. This lost energy may be replaced by a regenerative circuit [7] connected across the lines. With reference to FIG. 6 this circuit would normally show a decreasing current versus voltage or negative resistance characteristic between an upper voltage limit $+Vm$ at point M and a lower voltage limit $-Vm$ at point N, whilst an increasing current versus voltage characteristic would apply outside these limits. These upper and lower voltage limits should desirably be oppositely signed and equal in magnitude to the required signalling voltage magnitude. Only one such regenerative circuit would normally be needed per set of data lines, but a larger number would not be deleterious.

Figure 7:
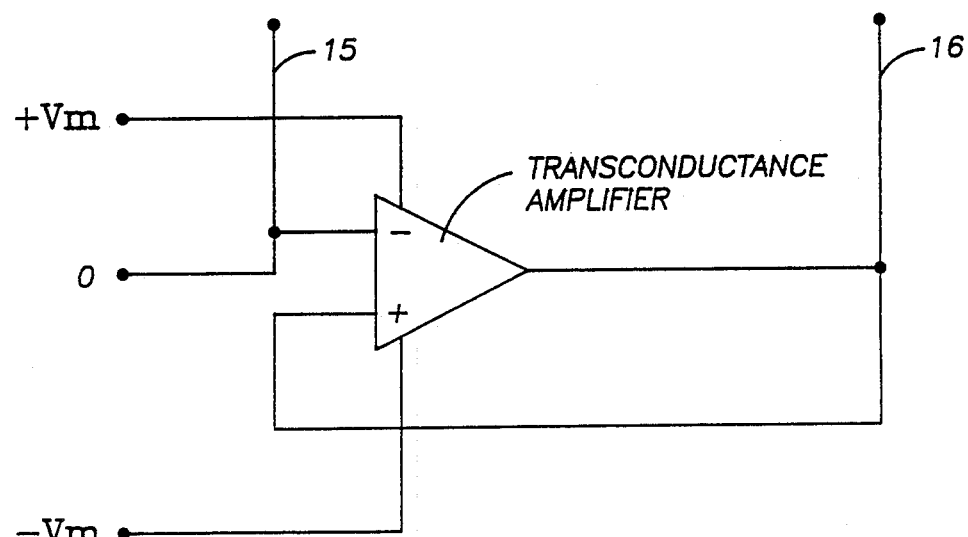
FIG. 7 is a typical embodiment of the regenerative circuit employing an amplifier with positive feedback.

An embodiment of the regenerative circuit [7] would typically employ either an amplifier with positive feedback or negative resistance devices such as Esaki diodes or multilayer junction devices. The schematic circuit of an embodiment of the regenerative circuit using a voltage controlled current source or transconductance amplifier with positive feedback is shown in FIG. 7. In this embodiment the upper and lower limit voltages are determined by the supply voltages of $+Vm$ and $-Vm$ while the slope of the negative resistance characteristic is determined by the value of the gain or transconductance of the controlled current source.

With reference to FIG. 1 the reception of the data transmitted by the above described resonant method would normally occur by means of a line receiver circuit [6] which senses the polarity of the potential difference between the data lines [1] and [2]. A typical embodiment of a receiver would consist of a voltage controlled device such a field effect transistor whose high impedance input terminals are connected to the data lines, and whose output terminals are connected via an isolating transformer to an impedance sensing circuit such as an A.C. bridge.

In many instances both receiving and transmitting circuits are required at the one location. In such an instance with reference to FIG. 1 and FIG. 2 a relatively simple embodiment of a line receiver circuit [6] would use a current sensing transformer with its primary winding connected in series with the additional lumped capacitance [21] of an associated transmitter. The sensed current pulses isolated by the transformer would normally be amplified by a pulse discrimination circuit used to determine the direction of the data transitions.

Many superficially different embodiments of the above mentioned data transmission system may be devised by one skilled in the art without essential changes to the system described herein.

I claim:

1. An arrangement for the transmission of binary data via electrical conductors, said arrangement including inductance, capacitance, an electronic switching device and a regenerative energy replacement circuit, said electronic switching device being in series with said inductance and in parallel with said capacitance, said capacitance being in parallel with said conductors, said capacitance and inductance forming a switched resonant circuit, said electronic switching device adapted to be switched on to permit current flow through said inductance until the charge on said capacitance has changed sign and returned to approximately the same magnitude present before switching on said electronic switching device, thus creating a reversal of the data state signalled via electronic conductors, after which point in time said electronic switching device is switched off until the next change of data state requiring to be signalled and said regenerative energy replacement circuit replacing any loss of charge due to losses occurring in any of the elements forming said arrangement, whereby the state of said binary data is represented by the polarity of the voltage between said electrical conductors.

2. The arrangement according to claim 1 wherein said electronic switching device consists of two separate limbs connected in parallel, the first of which said limbs includes a subsidiary electronic switching device connected in series with a diode which permits current to be switched in only one direction through said subsidiary electronic switching device, and the second of which said limbs is similar to the first said limb and connected with opposite polarity in parallel with the first said limb, one of which said limbs being used to reverse the charge polarity on the said electrical conductors in one direction only and the other of which said limbs being used to reverse the charge polarity in the other direction only, either of which said limbs automatically switching off after said charge polarity reversal by means of the polarity reversal on the diode.

3. The arrangement according to claim 2 wherein said subsidiary electronic switching devices consist of bipolar transistors, each having a base drive transformer, and where the base drive power for whichever transistor needs to be switched on is obtained by applying a voltage pulse to the primary of the transformer in the reverse direction to store energy in the inductance of said base drive transformer, and transferring this energy to the base of the transistor connected to the secondary of said base drive transformer after the voltage pulse terminates.

4. The arrangement according to claim 1, further comprising:
a transformer driving said electronic switching device for the purpose of obtaining galvanic isolation between said electrical conductors and a circuit from which data is being transmitted.

5. The arrangement according to claim 1, wherein said inductance and capacitance are of the electrical conductors themselves.

6. The arrangement according to claim 1, wherein said inductance is of the electrical conductors themselves.

7. The arrangement according to claim 1, wherein said capacitance is of the electrical conductors themselves.

8. The arrangement according to claim 1, wherein said inductance is one or more inductors.

9. The arrangement according to claim 1, wherein said capacitance is one or more capacitors.

* * * * *